No. 695,447. Patented Mar. 18, 1902.
C. E. EGAN.
APPARATUS FOR TEACHING TELEGRAPHY.
(Application filed Mar. 11, 1901.)

(No Model.)

Witnesses
Sidney P. Hollingsworth
D. E. Purdue

Inventor:
Charles E. Egan,
by Dodge & Sons,
Attorneys

THE NORRIS PETERS CO., PHOTO-LITHO., WASHINGTON, D. C.

United States Patent Office.

CHARLES E. EGAN, OF DURHAM, NORTH CAROLINA, ASSIGNOR TO JULIAN S. CARR, OF DURHAM, NORTH CAROLINA.

APPARATUS FOR TEACHING TELEGRAPHY.

SPECIFICATION forming part of Letters Patent No. 695,447, dated March 18, 1902.

Application filed March 11, 1901. Serial No. 50,619. (No model.)

*To all whom it may concern:*

Be it known that I, CHARLES E. EGAN, a citizen of the United States, residing at Durham, in the county of Durham and State of North Carolina, have invented certain new and useful Improvements in Apparatus for Teaching Telegraphy, of which the following is a specification.

My present invention pertains to improvements in apparatus for teaching telegraphy, the construction and advantages of which will be hereinafter set forth, reference being had to the annexed drawings, wherein—

Figure 1:
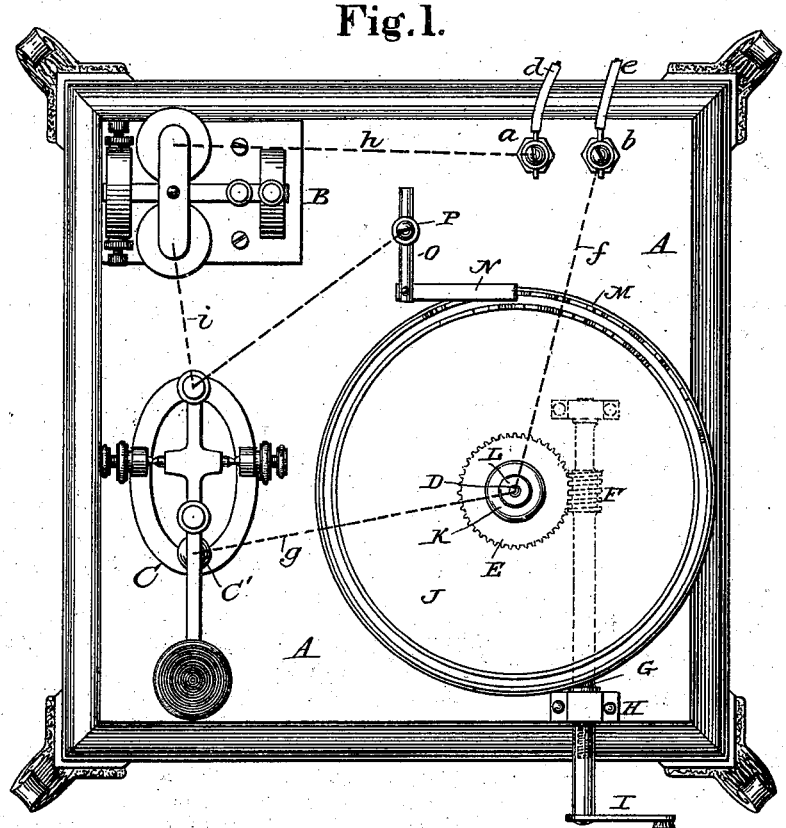
Figure 2:
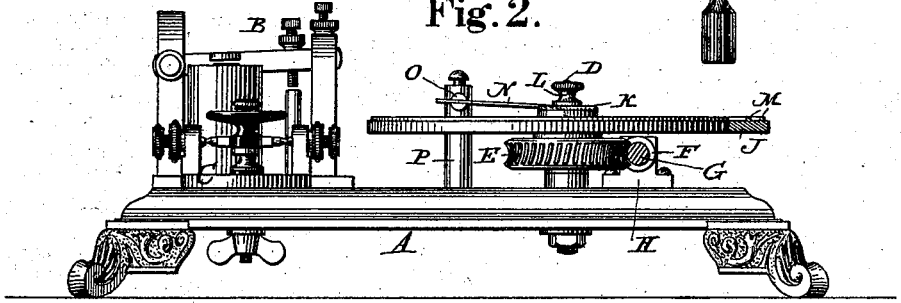
Figure 3:
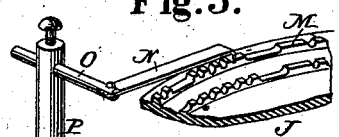
Figure 4:
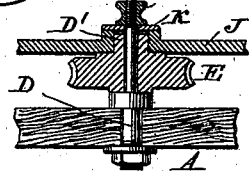

Figure 1 is a top plan view of the apparatus; Fig. 2, a side elevation of the same; Fig. 3, a perspective view of a portion of the make-and-break device; Fig. 4, a vertical sectional view illustrating the means employed for attaching the record to the operating means, and Fig. 5, a diagrammatic view showing the circuits.

The object of my invention is to provide a simple and efficient apparatus for teaching telegraphy with which the student may employ a record and by imparting motion to the same make and break the circuit and cause the sounder to act or when the record is out of line actuate the sender or key and cause the sounder to act. The parts are so arranged that but one battery is necessary to the operation of the apparatus. It is also proposed to employ a series of removable records or make-and-break devices, so that the student may be enabled to have a wide range of characters to study and not by constant repetition of one series of words become accustomed to their sound, and thus learn them by rote.

Referring to the drawings, A indicates the base of the apparatus, made of any suitable material and upon which is mounted a sounder B and a sender or key C, these parts being of any usual and approved type. Normally the key or sender is open, so that current will not pass therethrough. Extending up from the base is an upright stem or spindle D, the upper end of which is threaded, as indicated in Fig. 4. Mounted upon said spindle is a worm-wheel E, with which meshes a worm F, formed upon a shaft G, said shaft being mounted in suitable bearings H, secured upon the upper face of the base. The outer end of the shaft G extends beyond the edge of the base and has attached to it a crank I.

In the form illustrated in the drawings the upper face of the worm-wheel is provided with a hub D', which forms a bearing for a removable record or disk J, the record being held in place by a washer K and a nut L, screwed upon the upper threaded end of the spindle.

As indicated in the drawings, the disk or record J is provided with a series of upwardly-projecting contacts M, the contacts being formed to correspond with a dash or dot and being arranged upon the disk in such manner as to reproduce a message or sentence. A series of these make-and-break points or contacts may be formed upon the upper face of the disk concentric with the axis thereof, so that a finger N, carried by an arm O, may be moved over into line with one or another of said series, and thus cause one or another sentence to be repeated by the sounder which is in circuit with said finger, as will be hereinafter pointed out.

Arm O is adjustably mounted in a post or standard P to enable the student to shift the arm N into contact with one or another of the series of contacts or make-and-break points.

Figure 5:
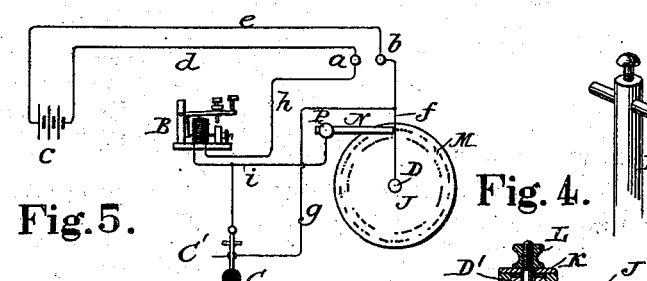

The circuits by which the disk and the sounder or key and the sender are brought into operative relation one with the other will be best understood upon reference to Figs. 1 and 5.

Mounted upon one side of the board or base A are two binding-posts $a$ $b$, post $a$ being in connection with the battery $c$ through line $d$, while post $b$ is in communication with the battery through line $e$. The post $b$ is in connection with the stem or spindle $d$, and through it with the record through a line $f$, while a branch line $g$ extends from the line $f$ or from the spindle $d$ to the contact member C' of the key C. Post $a$ is through a line $h$ connected to one side of the sounder B, while the opposite side of the sounder is connected by a circuit or line $i$ with the key and the contact-finger N.

Remembering that the key C is normally open, the circuit will, when the contact-finger N is in connection with one of the projections M, be from the battery through the wire $e$, post $b$, branch $f$, through the spindle and record to the arm N, thence to the sounder, and from the sounder back to the battery through branch $h$, post $a$, and line $d$. Thus it will be seen that by imparting rotary motion to the record the arm N will make and break the circuit as it comes into contact with the projections M, thereby causing the sounder to repeat the message.

Assuming that it be desired by the student to send a message, all that is necessary to do is to shift the record so that the spring-arm N will not be in contact with one of the projections M and the circuit just described accordingly broken. By then depressing the key the circuit will be completed from the battery through line $e$, post $b$, branches $f$ and $g$, key C, line $i$ to the sounder, thence through line $h$, post $a$, and line $d$ back to the battery.

It is designed in the use of this apparatus to provide a series of record disks or plates, so that, as above stated, a student shall not learn a message simply by rote, but will accustom himself to the reception of messages and thoroughly learn the combinations of dots and dashes used in telegraphy.

Having thus described my invention, what I claim is—

1. In an apparatus of the character described, the combination of a sounder; a sending-key; a disk having a series of make-and-break contacts formed thereon; means for rotating said disk; an adjustable contact-finger working in conjunction with said series of contacts, whereby one or the other of the series may be brought into operative relation therewith; a source of electric energy; and suitable electrical connections intermediate said source of energy and the other parts of the apparatus.

2. In an apparatus of the character described, the combination of a suitable base; a sounder mounted thereon; a sender likewise mounted on said base; a stem or spindle extending upwardly from said base; a disk or plate removably mounted upon said spindle and provided with a series of contacts formed upon said disk or plate; means for revolving said disk; an adjustable contact-finger for making connection with one or another of the series of contacts on the disks according to its adjustment; a source of electric energy; and connections intermediate said source of energy and the other portions of the apparatus.

3. In an apparatus of the character described, the combination of a sounder; a disk having a series of sentences formed thereon; a source of electric energy; connections intermediate said source, the sounder, and the disk; and means for bringing one or another of said sentences carried by the disk into operative relation with the sounder.

4. In an apparatus of the character described, the combination of a suitable base; a sounder; a sending-key; a spindle extending upwardly from said base; a worm-wheel E mounted on the spindle; a worm in operative connection with said worm-wheel; a disk J removably connected to said rack, said disk having a series of contacts extending from the upper face thereof; an adjustable contact-finger N; a source of electric energy; and connection intermediate said source, the sounder, the key, the disk, and said contact-finger, substantially as described.

In testimony whereof I have signed my name to this specification in the presence of two subscribing witnesses.

CHARLES E. EGAN.

Witnesses:
G. R. BLACKWELL,
THOS. M. GORMAN.